United States Patent
Iwai et al.

(10) Patent No.: US 10,873,913 B2
(45) Date of Patent: *Dec. 22, 2020

(54) WIRELESS COMMUNICATION DEVICE AND METHOD FOR CONTROLLING TRANSMISSION POWER

(71) Applicant: Sun Patent Trust, New York, NY (US)

(72) Inventors: Takashi Iwai, Ishikawa (JP); Daichi Imamura, Kanagawa (JP); Akihiko Nishio, Osaka (JP); Yoshihiko Ogawa, Kanagawa (JP); Shinsuke Takaoka, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,374

(22) Filed: Oct. 29, 2019

(65) Prior Publication Data
US 2020/0068503 A1 Feb. 27, 2020

Related U.S. Application Data

(63) Continuation of application No. 16/212,588, filed on Dec. 6, 2018, now Pat. No. 10,506,525, which is a
(Continued)

(30) Foreign Application Priority Data

Apr. 30, 2010 (JP) ................... 2010-105323
Nov. 5, 2010 (JP) ................... 2010-249128

(51) Int. Cl.
*H04W 52/24* (2009.01)
*H04W 52/14* (2009.01)
(Continued)

(52) U.S. Cl.
CPC ......... *H04W 52/241* (2013.01); *H04L 5/0048* (2013.01); *H04L 5/0051* (2013.01);
(Continued)

(58) Field of Classification Search
CPC ............. H04W 52/241; H04W 52/146; H04W 52/325; H04W 52/16; H04W 52/18;
(Continued)

(56) References Cited

U.S. PATENT DOCUMENTS 5,918,157 A   6/1999 Wiedeman et al.
6,067,442 A   5/2000 Wiedeman et al.
(Continued)

FOREIGN PATENT DOCUMENTS

CN   101573896 A   11/2009
CN   101669382 A   3/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)," *3GPP Technical Specification 36.213*, Version 9.1.0, Mar. 2010, 79 pages.
(Continued)

*Primary Examiner* — Ricardo H Castaneyra
(74) *Attorney, Agent, or Firm* — Seed IP Law Group LLP

(57) ABSTRACT

Disclosed is a wireless communication device that can suppress an increase in power consumption of a terminal while preventing the degradation of SINR measurement precision resulting from TPC errors in a base station. A terminal controls the transmission power of a second signal by adding an offset to the transmission power of a first signal; an offset-setting unit sets an offset correction value in response to a transmission time gap between a third signal transmitted the previous time and the second signal trans-
(Continued)

mitted this time; and a transmission power control unit controls the transmission power of the second signal using the correction value.

4 Claims, 14 Drawing Sheets

Related U.S. Application Data continuation of application No. 15/355,169, filed on Nov. 18, 2016, now Pat. No. 10,182,405, which is a continuation of application No. 14/702,523, filed on May 1, 2015, now Pat. No. 9,532,315, which is a continuation of application No. 13/643,256, filed as application No. PCT/JP2011/002479 on Apr. 27, 2011, now Pat. No. 9,055,535.

(51) Int. Cl.
  *H04W 52/16* (2009.01)
  *H04W 52/32* (2009.01)
  *H04L 5/00* (2006.01)
  *H04W 72/04* (2009.01)

(52) U.S. Cl.
  CPC ......... *H04W 52/146* (2013.01); *H04W 52/16* (2013.01); *H04W 52/325* (2013.01); *H04W 72/0473* (2013.01)

(58) Field of Classification Search
  CPC . H04W 52/36; H04W 88/02; H04W 72/0473; H04L 5/0051; H04L 5/0048
  See application file for complete search history.

(56) References Cited

U.S. PATENT DOCUMENTS

| | | |
|---|---|---|
| 7,054,633 B2 | 5/2006 | Seo et al. |
| 7,164,660 B2 | 1/2007 | Baker et al. |
| 7,164,914 B2 | 1/2007 | Moulsley et al. |
| 7,299,402 B2 | 11/2007 | Soong et al. |
| 7,701,910 B2 | 4/2010 | Yoon et al. |
| 8,099,132 B2 | 1/2012 | Kim et al. |
| 8,125,953 B2 | 2/2012 | Matsumoto et al. |
| 8,259,700 B2 | 9/2012 | Li et al. |
| 8,315,642 B2 | 11/2012 | Matsumoto et al. |
| 8,335,233 B2 | 12/2012 | Ishii |
| 8,351,347 B2 | 1/2013 | Noh et al. |
| 8,374,277 B2 | 2/2013 | Nakao et al. |
| 8,379,507 B2 | 2/2013 | Bertrand et al. |
| 8,417,248 B2 | 4/2013 | Papasakellariou et al. |
| 8,437,792 B2 | 5/2013 | Malladi et al. |
| 8,451,776 B2 | 5/2013 | Dayal et al. |
| 8,462,760 B2 | 6/2013 | Hao et al. |
| 8,467,723 B2 | 6/2013 | Saito et al. |
| 8,509,836 B2 | 8/2013 | Shin et al. |
| 8,520,492 B2 | 8/2013 | Li et al. |
| 8,554,257 B2 | 10/2013 | Hannu et al. |
| 8,688,163 B2 | 4/2014 | Chen et al. |
| 8,724,488 B2 | 5/2014 | Shin et al. |
| 8,787,289 B2 | 7/2014 | Noh et al. |
| 8,812,048 B2 | 8/2014 | Shin et al. |
| 8,837,380 B2 | 9/2014 | Montojo et al. |
| 8,848,642 B2 | 9/2014 | Noh et al. |
| 8,849,292 B2 | 9/2014 | Tiirola et al. |
| 8,938,247 B2 | 1/2015 | Gorokhov et al. |
| 9,100,924 B2 | 8/2015 | Suzuki et al. |
| 2002/0049057 A1 | 4/2002 | Moulsley et al. |
| 2003/0123396 A1 | 7/2003 | Seo et al. |
| 2003/0232622 A1 | 12/2003 | Seo et al. |
| 2004/0009785 A1 | 1/2004 | Nelson, Jr. et al. |
| 2004/0193971 A1 | 9/2004 | Soong et al. |
| 2006/0094372 A1 | 5/2006 | Ahn et al. |
| 2007/0243894 A1 | 10/2007 | Das et al. |
| 2008/0039098 A1 | 2/2008 | Papasakellariou et al. |
| 2008/0045260 A1 | 2/2008 | Muharemovic et al. |
| 2008/0200203 A1 | 8/2008 | Malladi et al. |
| 2008/0220806 A1 | 9/2008 | Shin et al. |
| 2008/0233967 A1 | 9/2008 | Montojo et al. |
| 2008/0280638 A1 | 11/2008 | Malladi et al. |
| 2009/0046800 A1 | 2/2009 | Xu et al. |
| 2009/0054093 A1 | 2/2009 | Kim et al. |
| 2010/0062799 A1 | 3/2010 | Ishii et al. |
| 2010/0074205 A1 | 3/2010 | Papasakellariou et al. |
| 2010/0103867 A1 | 4/2010 | Kishiyama et al. |
| 2010/0111008 A1 | 5/2010 | Ishii |
| 2010/0173660 A1 | 7/2010 | Liu et al. |
| 2010/0246561 A1 | 9/2010 | Shin et al. |
| 2010/0255847 A1 | 10/2010 | Lee et al. |
| 2011/0002415 A1 | 1/2011 | Nakao et al. |
| 2011/0032888 A1 | 2/2011 | Matsumoto et al. |
| 2011/0159914 A1 | 6/2011 | Chen et al. |
| 2011/0164604 A1 | 7/2011 | Hao et al. |
| 2011/0199944 A1 | 8/2011 | Chen et al. |
| 2011/0237290 A1 | 9/2011 | Nishikawa et al. |
| 2011/0243007 A1 | 10/2011 | Xiao |
| 2011/0250918 A1 | 10/2011 | Jen |
| 2011/0319119 A1 | 12/2011 | Ishii |
| 2012/0093119 A1 | 4/2012 | Kim et al. |
| 2012/0213146 A1 | 8/2012 | Liu et al. |
| 2012/0307869 A1 | 12/2012 | Charbit et al. |
| 2012/0309390 A1 | 12/2012 | Saito et al. |
| 2013/0012252 A1 | 1/2013 | Suzuki et al. |
| 2013/0078913 A1 | 3/2013 | Lee et al. |
| 2014/0293900 A1 | 10/2014 | Takeda et al. |
| 2015/0304084 A1 | 10/2015 | Suzuki et al. |

FOREIGN PATENT DOCUMENTS

| | | |
|---|---|---|
| JP | 2010-171931 A | 8/2010 |
| JP | 2011-142550 A | 7/2011 |
| RU | 2 251 220 C2 | 4/2005 |
| WO | 2009/122658 A1 | 10/2009 |
| WO | 2010/035702 A1 | 4/2010 |

OTHER PUBLICATIONS

English Translation of Chinese Search Report dated Jul. 7, 2014, for corresponding CN Application No. 201180018643.3, 2 pages.
English Translation of Russian Office Action dated Aug. 28, 2014, for corresponding RU Patent Application No. 2012145853/07(073666), 4 pages.
English translation of Search Report, dated Jan. 21, 2014, for corresponding Chinese Patent Application No. 201180018643.3, 2 pages.
Extended European Search Report, dated Jan. 4, 2017, for corresponding EP Application No. 11774644.6-1874 / 2566058, 10 pages.
Huawei, "Uplink Multi-Antenna Power Control," R1-101949, Agenda 6.2.5.5, 3GPP TSG RAN WG1 meeting #60bis, Beijing, China, Apr. 12-16, 2010, 4 pages.
InterDigital Communication, LLC, "Uplink power control procedures and Text Proposal for E-UTRA," R1-074388, 3GPP TSG RAN WG1 Meeting #50bis, Agenda Item: 6.4.2, Shanghai, China, Oct. 8-12, 2007, 11 pages.
International Search Report for International Application No. PCT/JP2011/002479, dated Jul. 26, 2011, 3 pages.
Sharp, "Consideration on SRS design for LTE-A UL multi-antenna transmission," R1-094493, Agenda Item: 7.4.2, 3GPP TSG RAN WG1 Meeting #59, Jeju, Korea, Nov. 9-13, 2009, 5 pages.

| ELAPSED TIME T | $\Delta_{OFFSET}$ |
|---|---|
| T ≦ 20ms | −6dB |
| T > 20ms | 0dB |

FIG.4

| SRS TRANSMISSION PERIOD $T_{SRS}$ | $\Delta_{OFFSET}$ |
|---|---|
| $T_{SRS}$ ≦ 20ms | −6dB |
| $T_{SRS}$ > 20ms | 0dB |

FIG.5

| $\Delta P$ | $\Delta_{OFFSET}$ |
|---|---|
| $15 \leqq \Delta P$ | 0dB |
| $10 \leqq \Delta P < 15$ | −1dB |
| $4 \leqq \Delta P < 10$ | −3dB |
| $3 \leqq \Delta P < 4$ | −4dB |
| $2 \leqq \Delta P < 3$ | −5dB |
| $\Delta P < 2$ | −6dB |

FIG.7

| TYPE OF SRS | $P_{SRS\_OFFSET}$ |
|---|---|
| APERIODIC SRS | 3dB |
| PERIODIC SRS | 0dB |

FIG.9

| TYPE OF SRS | | $P_{SRS\_OFFSET}$ |
|---|---|---|
| APERIODIC SRS | 1 SHOT SRS | 3dB |
| | MULTI SHOT SRS (TRANSMISSION IN SINGLE BAND) | 1.5dB |
| | MULTI SHOT SRS (TRANSMISSION IN DIFFERENT BANDS) | 3dB |

FIG.10

| TYPE OF SRS | $P_{SRS\_OFFSET}$ |
|---|---|
| APERIODIC SRS<br>SUBCARRIER INTERVAL=15kHz<br>(SRS TRANSMITTED USING DMRS SYMBOL) | 1.5dB |
| APERIODIC SRS<br>SUBCARRIER INTERVAL=30kHz<br>(SRS TRANSMITTED USING SYMBOL AT TAIL END OF SUBFRAME) | 3dB |

FIG.11

| ELAPSED TIME T | ΔP | $\Delta_{OFFSET}$ |
|---|---|---|
| T>20ms | — | 0dB |
| T≦20ms | 15≦ΔP | 0dB |
| | 10≦ΔP<15 | -1dB |
| | 4≦ΔP<10 | -3dB |
| | 3≦ΔP<4 | -4dB |
| | 2≦ΔP<3 | -5dB |
| | ΔP<2 | -6dB |

FIG.13

| CONDITIONS | TOLERANCE |
|---|---|
| NORMAL | ±9.0 |

FIG.14A

| POWER STEP ΔP (UP OR DOWN) [dB] | ALL COMBINATIONS OF PUSCH/PUCCH AND SRS TRANSITIONS BETWEEN SUB-FRAMES[dB] |
|---|---|
| ΔP<2 | ±3.0 |
| 2≦ΔP<3 | ±4.0 |
| 3≦ΔP<4 | ±5.0 |
| 4≦ΔP<10 | ±6.0 |
| 10≦ΔP<15 | ±8.0 |
| 15≦ΔP | ±9.0 |

FIG.14B

| ELAPSED TIME T | ΔP | $\Delta_{OFFSET}$ |
|---|---|---|
| T>20ms | 4≦ΔP | 0dB |
| | ΔP<4 | −1dB |
| T≦20ms | 15≦ΔP | −2dB |
| | 10≦ΔP<15 | −3dB |
| | 4≦ΔP<10 | −4dB |
| | 3≦ΔP<4 | −5dB |
| | 2≦ΔP<3 | −6dB |
| | ΔP<2 | −8dB |

FIG.15

| ELAPSED TIME T | $\Delta_{OFFSET}$ |
|---|---|
| T≦20ms | 0dB |
| T>20ms | +6dB |

FIG.17

| $\Delta P$ | $\Delta_{OFFSET}$ |
|---|---|
| $\Delta P<2$ | 0dB |
| $2\leq\Delta P<3$ | +1dB |
| ⋮ | ⋮ |
| $15\leq\Delta P$ | +6dB |

FIG.18

WIRELESS COMMUNICATION DEVICE AND METHOD FOR CONTROLLING TRANSMISSION POWER

BACKGROUND

Technical Field

The present invention relates to a radio communication apparatus and a method of controlling transmission power.

Description of the Related Art

In an uplink for 3GPP LTE (3rd Generation Partnership Project Long Term Evolution, hereinafter referred to as LTE), estimation of the channel quality between a terminal (user equipment, UE) and a base station (BS or eNB) using a sounding reference signal (SRS) is supported. The SRS is used mainly for scheduling of an uplink data channel (physical uplink shared channel, PUSCH) (e.g., frequency resource assignment and selection of a modulation and coding scheme (MCS)). "Sounding" refers to estimation of the channel quality between a terminal and a base station.

In LTE, similar transmission power control (TPC) is performed for a PUSCH and an SRS. Specifically, transmission power of SRS (SRS transmission power) is determined by adding an offset to transmission power of a PUSCH (PUSCH transmission power). For example, in LTE, SRS transmission power $P_{SRS}(i)$ in subframe #i is determined by the following Equation 1.

[1]

$$P_{SRS}(i) = \min\{P_{CMAX}, P_{SRS\_OFFSET} + 10 \log_{10}(M_{SRS}) + P_{O\_PUSCH} + \alpha \cdot PL + f(i)\} \quad \text{(Equation 1)}$$

In Equation 1, $P_{CMAX}$ [dBm] denotes maximum transmission power of an SRS that can be transmitted from a terminal; $P_{SRS\_OFFSET}$ [dBm] denotes an offset value for transmission power of a PUSCH to be transmitted from the terminal (parameter set by a base station); $M_{SRS}$ denotes the number of frequency resource blocks to be assigned to the SRS; $P_{O\_PUSCH}$ [dBm] denotes the initial value of the PUSCH transmission power (parameter set by the base station); PL denotes a path loss level [dB] measured by the terminal; $\alpha$ denotes a weight coefficient indicating the compensation ratio of the path loss (PL) (parameter set by the base station); and f(i) denotes an accumulated value in subframe #i containing past TPC command (control values such as +3 dB, +1 dB, 0 dB, and −1 dB) in closed loop control.

Meanwhile, standardization of LTE-Advanced, which is a developed version of LTE, is started. In LTE-Advanced, support for uplink transmission in which a terminal uses a plurality of antennas (single user-multiple input multiple output, SU-MIMO) is being studied. The SU-MIMO is a technique in which a single terminal transmits data signals in a certain frequency at a certain time from a plurality of antennas to spatial-multiplex the data signals through a virtual communication path (stream) in a space.

In order to perform communication by SU-MIMO in LTE-Advanced, a base station must know the status of a propagation path between each antenna of a terminal and each antenna of the base station. Hence, the terminal must transmit an SRS to the base station from each antenna.

Regarding the uplink for LTE-Advanced, a technique is being studied in which common transmission power control is employed among a plurality of antennas of a terminal in order to control transmission power of a PUSCH and an SRS (for example, see NPL 1). Specifically, at the terminal, a single value is used as each parameter in the equation for determining SRS transmission power, which is shown as Equation 1, uniformly for all antennas. This can prevent an increase in signaling load required for transmission power control at a terminal having a plurality of antennas.

CITATION LIST

Non-Patent Literature

NPL 1
R1-101949, Huawei, "Uplink Multi-Antenna Power Control"

BRIEF SUMMARY

Technical Problem

Meanwhile, when the reception SINR (signal to interference and noise ratio) of an SRS transmitted from a terminal to a base station (reception level of SRS at a base station) decreases to a certain level, the measurement accuracy of the channel quality (e.g., SINR measurement value) using SRSs between the base station and the terminal (SINR measurement accuracy) is significantly deteriorated due to an influence of interference and noise.

For example, FIG. 1 shows a simulation result indicating characteristics of the SINR measurement value of SRS (vertical axis) at a base station in relation to the reception SINR of SRS at the base station (input SINR [dB], horizontal axis). As shown in FIG. 1, when the input SINR of SRS is greater than 0 dB, the input SINR and the SINR measurement value are substantially the same values (indicated by the dashed line in FIG. 1), showing good SINR measurement accuracy at the base station. By contrast, as shown in FIG. 1, when the input SINR of SRS is 0 dB or less, an error (or variance) between the input SINR and the SINR measurement value is large, showing bad SINR measurement accuracy.

If the SINR measurement accuracy of SRS is deteriorated, the base station cannot perform precise scheduling of a PUSCH (such as frequency resource assignment and MCS selection), impairing the system performance.

Furthermore, when transmission power is controlled at a terminal, the SRS transmission power actually transmitted by the terminal may deviate from the target SRS transmission power set to the terminal. That is, at the terminal, an error occurs between the target SRS transmission power set to the terminal and the SRS transmission power actually transmitted by the terminal (hereinafter referred to as "TPC error"). Hence, if the SRS transmission power actually transmitted by the terminal is smaller than the target transmission power due to the TPC error, the reception SINR of SRS at the base station may decrease to a certain level (0 dB or less in FIG. 1), impairing the SINR measurement accuracy, as described above.

To prevent deterioration of the SINR measurement accuracy of SRS caused by the TPC error, a method may be employed in which the SRS transmission power is controlled by taking into consideration the variation of the TPC error. That is, the terminal sets the SRS transmission power such that the SRS transmission power is greater than the target transmission power by an assumed maximum TPC error. For example, the terminal increases offset value $P_{SRS\_OFFSET}$ for PUSCH transmission power shown in Equation 1 by adding the assumed maximum TPC error to the offset value. This prevents the reception SINR of SRS at the base station from decreasing to a certain level (not 0 dB or less in FIG. 1) even when the terminal receives the influence of the TPC error in controlling the SRS transmission power. Thus, deterioration of the SINR measurement accuracy can be prevented.

In this method of controlling SRS transmission power, however, greater SRS transmission power must be assigned to the terminal as the assumed maximum TPC error is greater, regardless of the actual TPC error. This increases power consumption of the terminal. In addition, another problem will arise in which an increase in SRS transmission power leads to an increase in inter-cell interference. Furthermore, if the common transmission power control is performed for a plurality of antennas when the terminal has the plurality of antennas as described above, SRS transmission power transmitted from all antennas increases as the assumed maximum TPC error increases. Thus, a problem of increased SRS transmission power and increased inter-cell interference becomes more noticeable.

It is an object of the present invention to provide a radio communication apparatus and a method of controlling transmission power that can reduce an increase in power consumption of a terminal while preventing deterioration of the SINR measurement accuracy caused by the TPC error at a base station.

Solution to Problem

A radio communication apparatus according to a first aspect of the present invention adds an offset value to transmission power of a first signal to control transmission power of a second signal, the radio communication apparatus including: a setting section that determines a correction value for the offset value according to the transmission period or the difference of transmission power between a third signal transmitted and the succeeding second signal to be transmitted; and a control section that uses the correction value to control the transmission power of the second signal.

A method of controlling transmission power in a radio communication apparatus that adds an offset value to transmission power of a first signal to control transmission power of a second signal according to a second aspect of the present invention, the method including: determining a correction value for the offset value according to the transmission period or the difference of transmission power between a third signal transmitted and the succeeding second signal to be transmitted; and using the correction value to control the transmission power of the second signal.

Advantageous Effects of Invention

According to the present invention, an increase in power consumption of a terminal can be reduced while deterioration of the SINR measurement accuracy caused by the TPC error is prevented at a base station.

BRIEF DESCRIPTION OF THE SEVERAL VIEWS OF THE DRAWINGS

FIG. 4 shows a correspondence between elapsed time T and a correction value for an offset value according to Embodiment 1 of the present invention;

FIG. 5 shows a correspondence between an SRS transmission period and a correction value for an offset value according to Embodiment 1 of the present invention;

FIG. 7 shows a correspondence between power difference ΔP and a correction value for an offset value according to Embodiment 2 of the present invention;

FIG. 9 shows a correspondence between the type of SRS and an offset value according to Embodiment 3 of the present invention;

FIG. 10 shows a correspondence between the type of SRS and an offset value according to Embodiment 3 of the present invention;

FIG. 11 shows a correspondence between the type of SRS and an offset value according to Embodiment 3 of the present invention;

FIG. 13 shows another correspondence among elapsed time T, power difference ΔP, and a correction value for an offset value according to the present invention;

FIG. 14A shows the allowable range of the TPC error in LTE (in the case of T>20 ms);

FIG. 14B shows the allowable range of the TPC error in LTE (in the case of T≤20 ms);

FIG. 15 shows another correspondence among elapsed time T, power difference ΔP, and a correction value for an offset value according to the present invention;

FIG. 17 shows another correspondence between elapsed time T and a correction value for an offset value according to the present invention; and FIG. 18 shows another correspondence between power difference ΔP and a correction value for an offset value according to the present invention.

DESCRIPTION

Embodiments of the present invention will now be described in detail with reference to the accompanying drawings. A terminal (radio communication apparatus) according to the embodiments of the present invention controls SRS transmission power by adding an offset value to PUSCH transmission power as shown in Equation 1.

Embodiment 1

Figure 2:
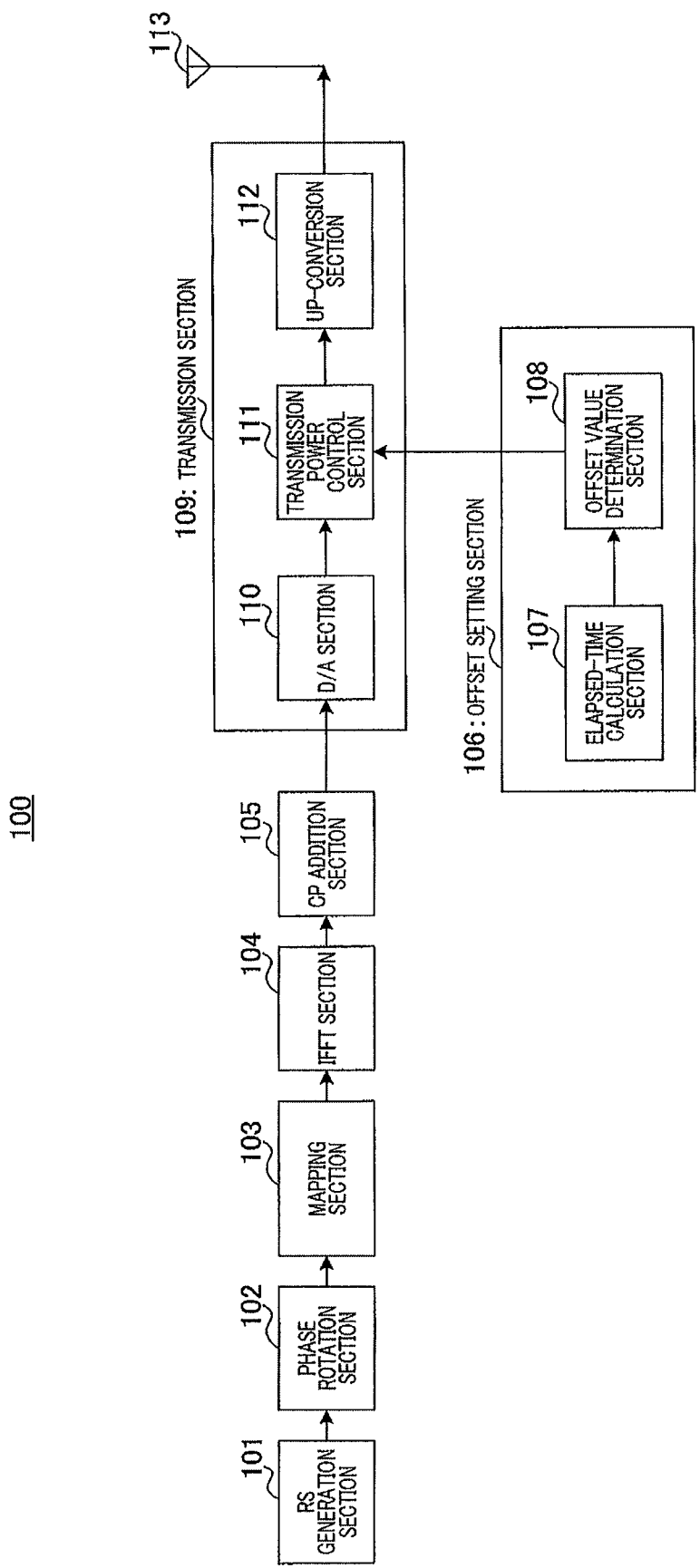
FIG. 2 is a block diagram of a configuration of a terminal according to Embodiment 1 of the present invention.

FIG. 2 shows a configuration of terminal 100 according to the present embodiment. At terminal 100 in FIG. 2, RS generation section 101 generates an RS sequence (SRS. For example, Zadoff-Chu (ZC) sequence) and outputs the generated RS sequence to phase rotation section 102.

Phase rotation section 102 performs phase rotation on the RS sequence received from RS generation section 101 and outputs the RS sequence after the phase rotation to mapping section 103, the phase rotation corresponding to a time domain cyclic shift amount (amount of cyclic shift (CS), not shown) instructed from the base station. Because samples of the RS sequence are assigned to subcarriers, the RS sequence is a frequency domain signal. Hence, the phase rotation process in the frequency domain in phase rotation section 102 is equivalent to a cyclic shift process in the time domain.

Mapping section 103 maps the RS sequence after the phase rotation received from phase rotation section 102 on a plurality of subcarriers, which are frequency resources, based on frequency resource assignment information (not shown) instructed from the base station, and outputs the mapped RS sequence to inverse fast Fourier transform (IFFT) section 104.

IFFT section 104 performs an IFFT process on the plurality of subcarriers in which the RS sequence is mapped and outputs the signal after the IFFT process to cyclic prefix (CP) addition section 105.

CP addition section 105 adds a signal identical to the tail of the signal after the IFFT process from IFFT section 104 to the head of the signal as a CP and outputs the resulting signal with the CP (SRS) to transmission section 109 (D/A section 110).

Offset setting section 106 includes elapsed-time calculation section 107 and offset value determination section 108. Offset setting section 106 determines an offset value for the PUSCH transmission power (hereinafter referred to as "transmission power offset value," i.e., a value corresponding to $P_{SRS\_OFFSET}$ shown in Equation 1). The offset value is used to determine transmission power of the RS sequence (SRS).

Specifically, elapsed-time calculation section 107 calculates an elapsed time between the transmission time of the uplink channel (e.g., uplink signal such as a PUSCH, a PUCCH and an SRS) transmitted from terminal 100 and the transmission time of the succeeding SRS to be transmitted from the terminal. Then, elapsed-time calculation section 107 outputs the calculated elapsed time to offset value determination section 108.

Offset value determination section 108 first determines an correction value for the offset value (i.e., $P_{SRS\_OFFSET}$ in Equation 1) according to the elapsed time received from elapsed-time calculation section 107, the offset value being instructed from the base station. Then, offset value determination section 108 corrects the offset value instructed from the base station using the determined correction value, thereby determining the transmission power offset value. Then, offset value determination section 108 outputs the transmission power offset value to transmission section 109 (transmission power control section 111). The process of setting the transmission power offset value in offset setting section 106 will be explained in detail later.

Transmission section 109 includes D/A section 110, transmission power control section 111, and up-conversion section 112. Transmission section 109 performs a transmission process such as D/A conversion, amplification, and up-conversion on the signal (SRS) from CP addition section 105.

Specifically, D/A section 110 of transmission section 109 performs D/A conversion on the signal (SRS) from CP addition section 105 and outputs the signal (SRS) after D/A conversion to transmission power control section 111.

Transmission power control section 111 uses the transmission power offset value from offset value determination section 108 to control transmission power of the signal with CP from D/A section 110, and outputs the signal (SRS) after the transmission power control to up-conversion section 112. That is, transmission power control section 111 uses the correction value for the offset value determined in offset value determination section 108 to control the SRS transmission power.

Up-conversion section 112 frequency-converts the signal after the transmission power control from transmission power control section 111 into the carrier wave frequency. Then, up-conversion section 112 transmits the frequency-converted signal after the transmission process from antenna 113. Through this process, the SRS is transmitted with the transmission power controlled in transmission power control section 111.

For example, according to the present embodiment, SRS transmission power $P_{SRS}(i)$ in subframe # i is determined by the following Equation 2.

[2]

$$P_{SRS}(i) = \min\{P_{CMAX}, (P_{SRS\_OFFSET} \pm \Delta_{offset}) + 10 \log_{10}(M_{SRS}) + P_{O\_PUSCH}(j) + \alpha(j) \cdot PL + f(i)\}$$ (Equation 2)

In Equation 2, $P_{CMAX}$ [dBm] denotes maximum transmission power of an SRS that can be transmitted from terminal 100; $P_{SRS\_OFFSET}$ [dBm] denotes the offset value for transmission power of a PUSCH to be transmitted from terminal 100 (parameter set by a base station); $M_{SRS}$ denotes the number of frequency resource blocks to be assigned to the SRS; $P_{O\_PUSCH}$ [dBm] denotes the initial value of the PUSCH transmission power (parameter set by the base station); PL denotes a path loss level [dB] measured by terminal 100; a denotes a weight coefficient indicating the compensation ratio of path loss (PL) (parameter set by the base station); f(i) denotes an accumulated value in subframe # i containing past TPC command (control values such as +3 dB, +1 dB, 0 dB, and −1 dB) in closed loop control. Furthermore, in Equation 2, $\Delta_{offset}$ denotes a correction value for offset value $P_{SRS\_OFFSET}$ that is associated with the elapsed time calculated in elapsed-time calculation section 107.

That is, offset value determination section 108 determines correction value $\Delta_{offset}$ for correcting offset value $P_{SRS\_OFFSET}$ instructed from the base station based on the elapsed time calculated in elapsed-time calculation section 107, as shown in Equation 2. Then, offset value determination section 108 adds correction value $\Delta t_{offset}$ to offset value $P_{SRS\_OFFSET}$ to determine transmission power offset value ($P_{SRS\_OFFSET} + \Delta A_{offset}$), as shown in Equation 2. Transmission power control section 111 controls SRS transmission power $P_{SRS}(i)$ in accordance with Equation 2, using transmission power offset value ($P_{SRS\_OFFSET} + \Delta_{offset}$) received from offset value determination section 108.

Figure 3:
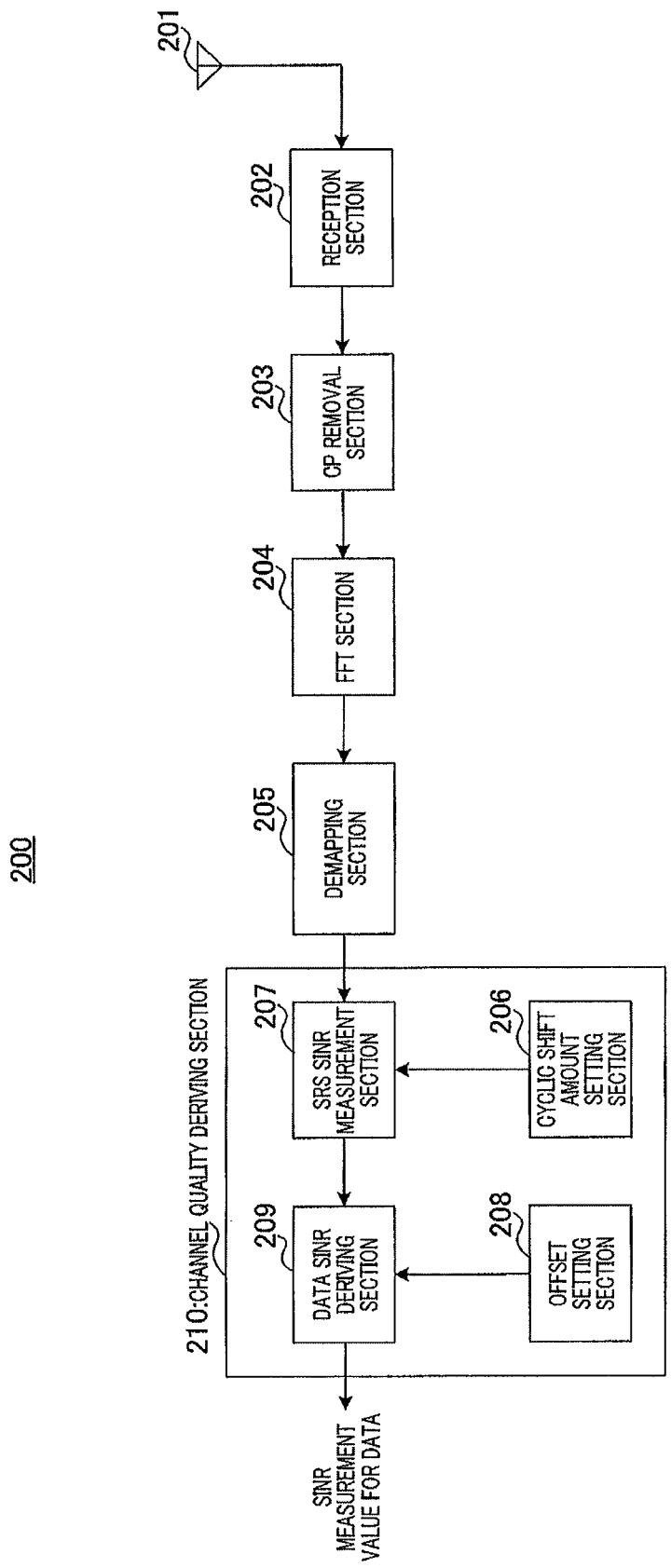
FIG. 3 is a block diagram of a configuration of a base station according to Embodiment 1 of the present invention.

FIG. 3 shows a configuration of base station 200 according to the present embodiment. In base station 200 in FIG. 3, reception section 202 receives a signal transmitted from terminal 100 (FIG. 2) via antenna 201 and performs a reception process such as down-conversion and A/D conversion on the received signal. The signal transmitted from terminal 100 contains an SRS. Then, reception section 202 outputs the signal after the reception process to CP removal section 203.

CP removal section 203 removes the CP added to the head of the signal after the reception process from reception section 202 and outputs the signal without CP to fast Fourier transform (FFT) section 204.

FFT section 204 performs an FFT process on the signal without CP from CP removal section 203 to convert the signal into the frequency domain signal and outputs the frequency domain signal to demapping section 205.

Demapping section 205 extracts a signal (i.e., SRS) corresponding to the transmission band (frequency resources) of a desired terminal (desired terminal subject to communication) from the frequency domain signal received from FFT section 204, based on the frequency resource assignment information for the desired terminal instructed from base station 200 to terminal 100. Then, demapping section 205 outputs the extracted signal (SRS) to section 207 for measuring SINR for SRS (SRS SINR measurement section 207).

Cyclic shift amount setting section 206 outputs a cyclic shift amount of terminal 100 (desired terminal), which is instructed from base station 200 to terminal 100, to SRS SINR measurement section 207.

SRS SINR measurement section 207 performs complex division on the SRS from demapping section 205 and the RS sequence known by the transmitting and receiving sides to determine a correlation signal in the frequency domain. Then, SRS SINR measurement section 207 performs the inverse discrete Fourier transform (IDFT) process on the correlation signal in the frequency domain to calculate the correlation signal in the time domain (i.e., delay profile). This delay profile contains SRSs of a plurality of terminals. Thus, SRS SINR measurement section 207 uses the amount of cyclic shift of the desired terminal received from cyclic shift amount setting section 206 to mask part of the delay profile other than the part corresponding to the amount of cyclic shift of the desired terminal, thereby calculating the SINR measurement value of the SRS (SINR measurement value for SRS) of the desired terminal. Then, SRS SINR measurement section 207 outputs the calculated SINR measurement value for SRS to section 209 for deriving SINR for data (data SINR deriving section 209).

Offset setting section 208 performs the same process as offset setting section 106 of terminal 100. That is, offset setting section 208 determines an offset value of transmission power for PUSCH (transmission power offset value, i.e., $(P_{SRS\_OFFSET}+\Delta_{offset})$) shown in Equation 2). The offset is used to determine the transmission power of SRS to be transmitted from terminal 100 (desired terminal). That is, offset setting section 208 determines correction value $\Delta_{offset}$ for offset value $P_{SRS\_OFFSET}$ according to the elapsed time between the transmission time of the uplink channel transmitted from the desired terminal and the transmission time of the succeeding SRS to be transmitted from the terminal, and determines transmission power offset value $(P_{SRS\_OFFSET}+\Delta_{offset})$. Then, offset setting section 208 outputs the determined transmission power offset value $(P_{SRS\_OFFSET}+\Delta_{offset})$ to data SINR deriving section 209.

Data SINR deriving section 209 uses the SINR measurement value for SRS from SRS SINR measurement section 207 and the transmission power offset value from offset setting section 208 to derive SINR of uplink data (i.e., PUSCH) (SINR measurement value for data). Specifically, data SINR deriving section 209 uses transmission power offset value $(P_{SRS\_OFFSET}+\Delta_{offset})$ to derive the SINR measurement value for data in accordance with the following equation 3.

[3]

SINR measurement value for data=SINR measurement value for SRS$-(P_{SRS\_OFFSET}+\Delta_{offset})$ (Equation 3)

Then, base station 200 performs scheduling of terminal 100 (e.g., frequency resource assignment and MCS selection) using, for example, the SINR measurement value for data derived in data SINR deriving section 209.

In base station 200, channel quality deriving section 210 including cyclic shift amount setting section 206, SRS SINR measurement section 207, offset setting section 208, and data SINR deriving section 209 may be configured.

Next, the process of setting the transmission power offset value in offset setting section 106 of terminal 100 (FIG. 2) will now be explained in detail.

The temperature of a power amplifier (PA) of terminal 100 varies as time elapses. Thus, the amplification characteristics of the PA varies as time elapses. For this reason, the longer a transmission time interval between uplink channels (uplink signal including a PUSCH, a PUCCH, and an SRS) is, the more significantly the amplification characteristics of the PA of terminal 100 varies. That is, it is assumed that an increase of the transmission time interval between uplink channels leads to an increase in the TPC error.

That is, in terminal 100, the TPC error varies depending on the elapsed time (transmission time interval) between the transmission time of the uplink channel and the transmission time of the succeeding uplink channel. Specifically, the TPC error decreases as the elapsed time between the transmission time of the uplink channel and the transmission time of the succeeding uplink channel (transmission time interval) decreases.

Hence, offset setting section 106 determines an transmission power offset value $((P_{SRS\_OFFSET}+\Delta_{offset})$ shown in Equation 2), which is used to determine the SRS transmission power, according to the elapsed time (transmission time interval) between the transmission time of the uplink channel and the transmission time of the succeeding SRS.

In the following explanation, terminal 100 uses the equation of transmission power shown in Equation 2 to calculate SRS transmission power $P_{SRS}(i)$. $P_{SRS\_OFFSET}$ shown in Equation 2 is determined with reference to an assumed maximum TPC error. That is, $P_{SRS\_OFFSET}$ shown in Equation 2 is a parameter determined to reduce or prevent the deterioration of the SINR measurement accuracy of SRS at base station 200 even when the assumed maximum TPC error occurs. Furthermore, $P_{SRS\_OFFSET}$ shown in Equation 2 is reported (instructed) from base station 200 to terminal 100. In the following explanation, the TPC error is defined as "small" if elapsed time (transmission time interval) T between the transmission time of the uplink channel and the transmission time of the succeeding SRS is 20 ms or less, and the TPC error is defined as "large" if elapsed time T is longer than 20 ms.

Elapsed-time calculation section 107 calculates elapsed time T between the transmission time of the uplink channel and the transmission time of the succeeding SRS.

Next, offset value determination section 108 determines correction value $\Delta_{offset}$ for offset value $P_{SRS\_OFFSET}$ instructed from base station 200 according to elapsed time T calculated in elapsed-time calculation section 107.

For example, as shown in FIG. 4, offset value determination section 108 sets correction value $\Delta_{offset}$ to −6 dB in the case of elapsed time T of 20 msec or less (the TPC error is small), and sets correction value $\Delta_{offset}$ to 0 dB in the case of elapsed time T longer than 20 msec (the TPC error is large). Then, offset value determination section 108 adds correction value $\Delta_{offset}$ to offset value $P_{SRS\_OFFSET}$ instructed from base station 200 to determine transmission power offset value $(P_{SRS\_OFFSET}+\Delta_{offset})$.

That is, in the case where offset value $P_{SRS\_OFFSET}$ instructed from base station 200 is determined with reference to an assumed maximum TPC error, offset value determination section 108 sets correction value $\Delta_{offset}$ to 0 dB in the case of longer elapsed time T (T>20 ms in FIG. 4)

and uses offset value $P_{SRS\_OFFSET}$ instructed from base station 200 as the transmission power offset value without change. On the other hand, offset value determination section 108 determines correction value $\Delta_{offset}$ to −6 dB in the case of shorter elapsed time T (T≥20 ms in FIG. 4) and corrects offset value $P_{SRS\_OFFSET}$ instructed from base station 200 into a smaller value, and thus sets the smaller value than offset value $P_{SRS\_OFFSET}$ as the transmission power offset value.

As described above, terminal 100 sets a different correction value for the offset value instructed from base station 200 according to the transmission time interval (elapsed time T) between the uplink channel transmitted and the succeeding SRS to be transmitted. Specifically, terminal 100 determines correction value $\Delta_{offset}$ such that SRS transmission power $P_{SRS}(i)$ in the case of shorter elapsed time T (T≥20 ms in FIG. 4, i.e., the TPC error is small) is smaller than SRS transmission power $P_{SRS}(i)$ in the case of longer elapsed time T (T>20 ms in FIG. 4, i.e., the TPC error is large). That is, terminal 100 sets smaller SRS transmission power $P_{SRS}(i)$ for shorter elapsed time T.

Figure 1:
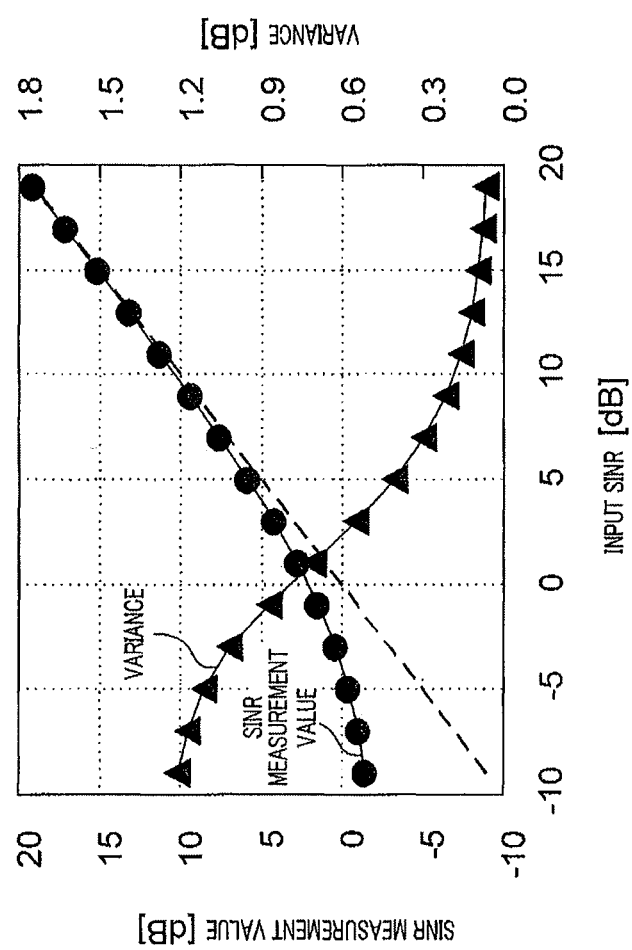
FIG. 1 is a graph showing characteristics of a SINR measurement value of SRS in relation to input SINR of SRS at a base station.

As described above, the TPC error decreases as elapsed time T decreases. For this reason, when terminal 100 sets smaller SRS transmission power for shorter elapsed time T (T≥20 ms in FIG. 4), there is a low probability that the reception SINR decreases to a certain level (0 dB or less in FIG. 1) due to the influence of the TPC error. Thus, the SINR measurement accuracy at base station 200 is less likely to be deteriorated.

That is, terminal 100 can set the SRS transmission power down to a necessary minimum value with which a desired reception SINR can be acquired at base station 200 by correcting the offset value instructed from base station 200 according to elapsed time T. Here, the desired reception SINR refers to reception SINR with which the SINR measurement accuracy is not deteriorated. With this configuration, the SINR measurement accuracy of SRS (measurement accuracy of channel quality) at base station 200 can be ensured while power consumption at terminal 100 is reduced to a necessary minimum. In other words, determination of appropriate SRS transmission power according to the assumed TPC error at terminal 100 can reduce waste power consumption.

In this way, according to the present embodiment, the terminal determines the transmission power offset value according to the transmission condition (in the present embodiment, transmission time interval) about the relationship between the uplink channel (uplink signal) transmitted and the succeeding SRS to be transmitted. With this configuration, the terminal can reduce SRS transmission power as the above transmission time interval is shorter, i.e., the influence of the TPC error is smaller. This can prevent deterioration of the SINR measurement accuracy caused by the TPC error at the base station while suppressing an increase in power consumption of the terminal. Furthermore, according to the present embodiment, the terminal can reduce the inter-cell interference by reducing the SRS transmission power to a necessary minimum.

Furthermore, in the present embodiment, in the case where, for example, the system defines in advance the correspondence between elapsed time T and correction value $\Delta_{offset}$ shown in FIG. 4, signaling does not need to be performed for every SRS transmission for SRS transmission power control. Alternatively, in the case where the correspondence between elapsed time T and correction value $\Delta_{offset}$ shown in FIG. 4 is reported in advance from the base station to a terminal as a parameter, the parameter needs to be reported in a relatively long period or just once to the terminal and signaling does not need to be performed for every SRS transmission for SRS transmission power control. Thus, in such cases, an increase in signaling overhead for the SRS transmission power control can be suppressed.

Furthermore, according to the present embodiment, because the base station can know the difference between the SRS transmission power and the PUSCH transmission power (i.e., transmission power offset value for SRS), the base station can derive the SINR measurement value for PUSCH (SINR measurement value for data) from the SINR measurement value of SRS (SINR measurement value for SRS). Thus, prevention of deterioration of the SINR measurement accuracy of SRS at the base station as described above can lead to prevention of deterioration of the SINR measurement accuracy of PUSCH. This enables the base station to perform precise scheduling of PUSCH (frequency resource assignment and MCS selection).

In the present embodiment, the case has been described in which the terminal uses elapsed time T between the transmission time of the uplink channel and the transmission time of the succeeding SRS (FIG. 4). In the present invention, however, the terminal may determine correction value $\Delta_{offset}$ for offset value $P_{SRS\_OFFSET}$, which is instructed from the base station, according to an elapsed time between the transmission time of the SRS transmitted from the terminal and the transmission time of the succeeding SRS to be transmitted (i.e., the transmission period of SRS). Specifically, as shown in FIG. 5, the terminal may set correction value $\Delta_{offset}$ to −6 dB in the case of SRS transmission period $T_{SRS}$ of 20 ms or less (the TPC error is small), and may set correction value $\Delta_{offset}$ to 0 dB in the case of SRS transmission period $T_{SRS}$ longer than 20 ms (the TPC error is large). That is, the terminal determines offset value $P_{SRS\_OFFSET}$ such that the SRS transmission power in the case of a shorter SRS transmission period is smaller than the SRS transmission power in the case of a longer SRS transmission period. In FIG. 5, $P_{SRS\_OFFSET}$ shown in Equation 2 is determined with reference to an assumed maximum TPC error, as with FIG. 4. That is, the terminal sets smaller correction value $\Delta_{offset}$ for shorter SRS transmission period $T_{SRS}$ to reduce the SRS transmission power. In other words, the terminal determines correction value $\Delta_{offset}$ such that the SRS transmission power in the case of shorter SRS transmission period $T_{SRS}$ ($T_{SRS}$≤20 ms in FIG. 5, i.e., the TPC error is small) is smaller than the SRS transmission power in the case of longer SRS transmission period $T_{SRS}$ ($T_{SRS}$>20 ms in FIG. 5, i.e., the TPC error is large). Here, SRS transmission period $T_{SRS}$ is a parameter reported in advance from the base station to a terminal. Hence, the base station can determine the offset value according to the SRS transmission period and thus does not need to always grasp the transmission times of uplink channels in all terminals (elapsed times T in FIG. 4) unlike the present embodiment. That is, compared to a case described in the present embodiment (when elapsed time T in FIG. 4 is used), in the case where SRS transmission period $T_{SRS}$ is used for SRS transmission power control, it is easy to share information for the SRS transmission power control (process of setting the transmission power offset value) between the terminal (offset setting section 106 in FIG. 2) and the base station (offset setting section 208 in FIG. 3).

Furthermore, periodically-transmitted SRSs are explained in FIG. 5. The present invention, however, may be applied to the SRS to which no transmission period is set (SRS without a transmission period), such as a one-shot SRS. For example, a terminal may treat an SRS without a transmission period as the SRS with a maximum transmission period among the transmission periods of the SRSs to which a transmission period is set (e.g., 320 ms in LTE). Alternatively, the terminal may determine the transmission power offset value for the SRS without a transmission period according to elapsed time T between the transmission time of the uplink channel (PUSCH, PUCCH, or SRS) transmitted and the transmission time of the succeeding SRS (such as one-shot SRS), as with the case in FIG. 4.

Furthermore, in the present embodiment, a case has been explained in which the terminal selects either of two values as correction value $\Delta_{offset}$ for offset value $P_{SRS\_OFFSET}$, which is instructed from the base station, according to elapsed time T in FIG. 4 or SRS transmission period $T_{SRS}$ in FIG. 5 (i.e., the case in which transmission power offset value ($P_{SRS\_OFFSET}+\Delta_{offset}$) shown in Equation 2 may take two values.) Alternatively, the terminal may select one of three or more values as correction value $\Delta_{offset}$ for offset value $P_{SRS\_OFFSET}$, which is instructed from the base station, according to elapsed time T or SRS transmission period $T_{SRS}$ (i.e., transmission power offset value ($P_{SRS\_OFFSET}+\Delta_{offset}$) shown in Equation 2 may take three or more values).

Furthermore, in the present embodiment, a case has been explained in which the terminal changes correction value $\Delta_{offset}$ for offset value $P_{SRS\_OFFSET}$ instructed from the base station according to elapsed time T or SRS transmission period $T_{SRS}$ as shown in FIG. 4 or 5. Alternatively, the terminal may change the equations for determining the SRS transmission power according to elapsed time T or SRS transmission period $T_{SRS}$. For example, the terminal calculates SRS transmission power $P_{SRS}(i)$ in accordance with the following Equation 4 if elapsed time T is 20 ms or less, and calculates SRS transmission power $P_{SRS}(i)$ in accordance with the following Equation 5 if elapsed time T is longer than 20 ms.

[4]

$$P_{SRS}(i)=\min\{P_{CMAX},(P_{SRS\_OFFSET}+\Delta_{offset})+10\log_{10}(M_{SRS})+P_{O\_PUSCH}(j)+\alpha(j)\cdot PL+f(i)\}$$ (Equation 4)

[5]

$$P_{SRS}(i)=\min\{P_{CMAX},P_{SRS\_OFFSET}+10\log_{10}(M_{SRS})+P_{O\_PUSCH}(j)+\alpha(j)\cdot PL+f(i)\}$$ (Equation 5)

In Equations 4 and 5, $P_{SRS\_OFFSET}$ is set as a value that can prevent deterioration of the SINR measurement accuracy even if a maximum TPC error occurs which is expected in the case of longer elapsed time T than 20 ms. That is, if elapsed time T is longer than 20 ms (the TPC error is large), the terminal calculates SRS transmission power $P_{SRS}(i)$ without correcting offset value $P_{SRS\_OFFSET}$ as shown in Equation 5. On the other hand, if elapsed time T is 20 ms or less (the TPC error is small), the terminal uses correction value $\Delta_{offset}$ to correct offset value $P_{SRS\_OFFSET}$, and calculates SRS transmission power $P_{SRS}(i)$, as shown in Equation 4. With this configuration, as with the present embodiment, power consumption of the terminal can be reduced while deterioration of the SINR measurement accuracy of SRS is prevented.

Embodiment 2

In Embodiment 1, a case has been described in which a terminal determines a correction value for an offset value instructed from a base station according to the transmission time interval (elapsed time) between the uplink channel transmitted and the succeeding SRS to be transmitted. In the present embodiment, a case will be described in which the terminal determines the correction value for the offset value instructed from the base station according to the difference in transmission power between the uplink channel transmitted and the succeeding SRS to be transmitted.

Figure 6:
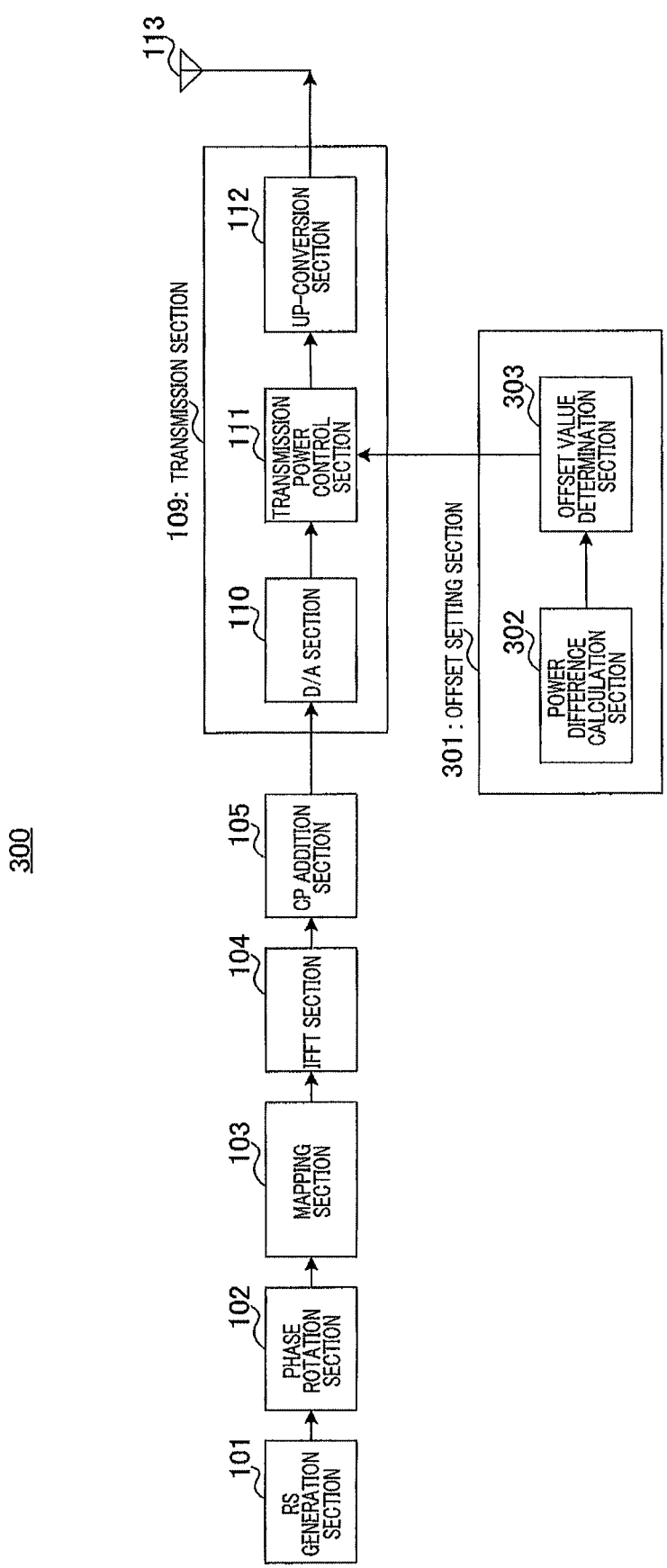
FIG. 6 is a block diagram of a configuration of a terminal according to Embodiment 2 of the present invention.

The present embodiment will now be described in detail. FIG. 6 shows a configuration of terminal 300 according to the present embodiment. Components in FIG. 6 that are the same as components in Embodiment 1 (FIG. 2) will be assigned the same reference numerals as in FIG. 2 and overlapping explanations will be omitted.

In terminal 300 in FIG. 6, offset setting section 301 includes power difference calculation section 302 and offset value determination section 303. Offset setting section 301 determines an offset value for PUSCH transmission power (transmission power offset value. ($P_{SRS\_OFFSET}+\Delta_{offset}$) shown in Equation 2) which is used to determine transmission power of the RS sequence (SRS).

Specifically, power difference calculation section 302 calculates power difference $\Delta P$ (scale of relative power tolerance), which is the difference between the transmission power of the uplink channel transmitted from terminal 300 (e.g., an uplink signal including a PUSCH, a PUCCH and an SRS) and the transmission power of the succeeding SRS to be transmitted from terminal 300. Power difference calculation section 302 uses transmission power calculated by using uncorrected offset value $P_{SRS\_OFFSET}$ instructed from base station 200 (FIG. 3), as the transmission power of the succeeding SRS to be transmitted. Then, power difference calculation section 302 outputs the calculated power difference $\Delta P$ to offset value determination section 303.

Offset value determination section 303 determines correction value $\Delta_{offset}$ for offset value $P_{SRS\_OFFSET}$ instructed from base station 200 according to power difference $\Delta P$ from power difference calculation section 302. Then, offset value determination section 303 uses the determined correction value $\Delta_{offset}$ to correct offset value $P_{SRS\_OFFSET}$ instructed from base station 200, thereby determining transmission power offset value (($P_{SRS\_OFFSET}+\Delta_{offset}$) shown in Equation 2). Then, offset value determination section 303 outputs the determined offset value ($P_{SRS\_OFFSET}+\Delta_{offset}$) for the PUSCH transmission power to transmission power control section 111.

Furthermore, offset setting section 208 (FIG. 3) of base station 200 according to the present embodiment performs the same process as offset setting section 301 of terminal 300. That is, offset setting section 208 determines the offset value for the PUSCH transmission power (transmission power offset value, i.e., ($P_{SRS\_OFFSET}+\Delta_{offset}$) shown in Equation 2), which is used to determine the transmission power of an SRS to be transmitted from terminal 300 (desired terminal). That is, offset setting section 208 determines correction value $\Delta_{offset}$ for offset value $P_{SRS\_OFFSET}$ according to power difference $\Delta P$, which is the difference between the transmission power of the uplink channel transmitted from a desired terminal and the transmission power of the succeeding SRS to be transmitted from the desired terminal (transmission power calculated by using uncorrected offset value $P_{SRS\_OFFSET}$), and determines transmission power offset value ($P_{SRS\_OFFSET}+\Delta_{offset}$).

Next, the process of setting the transmission power offset value in offset setting section 301 of terminal 300 (FIG. 6) will be explained in detail.

Here, in the case where an amplifier circuit having a plurality of power amplifiers (PAs) is employed in terminal 300, the number of PAs used for amplification varies more significantly as the power difference, which is the difference between the transmission power of the uplink channel transmitted (a PUSCH, a PUCCH, or an SRS) and the transmission power of the succeeding uplink to be transmitted, increases. That is, since the number of PAs used for amplification varies more significantly as the power difference between uplink channels increases, errors in the PAs are added up after the power difference is caused, increasing the TPC error.

Furthermore, transmission power is proportional to the frequency bandwidth of a transmission signal. For this reason, the frequency position and bandwidth of a transmission signal varies more significantly as the power difference increases (as the transmission power increases or decreases more significantly). Furthermore, because the amplification characteristics of the PA also depends on the frequency (frequency position and bandwidth), the TPC error increases as the power difference increases (as the frequency position and bandwidth varies more significantly).

That is, at terminal 300, the TPC error varies depending on the power difference between the transmission power of the uplink channel transmitted and the transmission power of the succeeding uplink channel to be transmitted. Specifically, the TPC error is assumed to decrease as the power difference decreases (as the number of PAs varies less significantly, i.e., the frequency position and bandwidth of the transmission signal varies less significantly).

In view of the above, offset setting section 301 determines the transmission power offset value (($P_{SRS\_OFFSET}+\Delta_{offset}$) shown in Equation 2) according to power difference $\Delta P$, which is the difference between the transmission power of the uplink channel transmitted and the transmission power of the SRS that is calculated using offset value $P_{SRS\_OFFSET}$ (the transmission power of the succeeding SRS to be transmitted). The transmission power offset value is used to determine the SRS transmission power.

In the following explanation, as with Embodiment 1, terminal 300 uses the equation of transmission power shown in Equation 2 to calculate SRS transmission power $P_{SRS}(i)$. $P_{SRS\_OFFSET}$ shown in Equation 2 is determined with reference to an assumed maximum TPC error as with Embodiment 1. Furthermore, $P_{SRS\_OFFSET}$ shown in Equation 2 is reported from base station 200 to terminal 300, as with Embodiment 1.

Power difference calculation section 302 in offset setting section 301 calculates power difference $\Delta P$, which is the difference between the transmission power of the uplink channel transmitted and the transmission power calculated using offset value $P_{SRS\_OFFSET}$ (the transmission power of the succeeding SRS to be transmitted that is calculated using uncorrected offset value).

Then, offset value determination section 303 in offset setting section 301 determines correction value $\Delta_{offset}$ for offset value $P_{SRS\_OFFSET}$ instructed from base station 200 according to power difference $\Delta P$ calculated in power difference calculation section 302.

For example, as shown in FIG. 7, offset value determination section 303 determines correction value $\Delta_{offset}$ as follows: 0 dB is associated with power difference $\Delta P$ of 15 dB or greater, −1 dB is associated with power difference $\Delta P$ of 10 dB or greater and less than 15 dB, −3 dB is associated with power difference $\Delta P$ of 4 dB or greater and less than 10 dB, −4 dB is associated with power difference $\Delta P$ of 3 dB or greater and less than 4 dB, −5 dB is associated with power difference $\Delta P$ of 2 dB or greater and less than 3 dB, and −6 dB is associated with power difference $\Delta P$ of less than 2 dB. Then, offset value determination section 303 adds above-determined correction value $\Delta_{offset}$ to offset value $P_{SRS\_OFFSET}$ instructed from base station 200 to determine transmission power offset value ($P_{SRS\_OFFSET}+\Delta_{offset}$).

That is, in the case where offset value $P_{SRS\_OFFSET}$ instructed from base station 200 is determined with reference to an assumed maximum TPC error, offset value determination section 303 sets smaller correction value $\Delta_{offset}$ for smaller power difference $\Delta P$ (smaller TPC error). That is, offset value determination section 303 corrects offset value $P_{SRS\_OFFSET}$ into a smaller value for smaller power difference $\Delta P$, and sets the smaller value than offset value $P_{SRS\_OFFSET}$ as the transmission power offset value.

As described above, terminal 300 sets a different correction value for the offset value instructed from base station 200 according to the difference in the transmission power (power difference $\Delta P$) between the uplink channel transmitted from terminal 300 and the succeeding SRS to be transmitted from the terminal 300. Specifically, terminal 300 determines correction value $\Delta_{offset}$ such that SRS transmission power $P_{SRS}(i)$ in the case of smaller power difference $\Delta P$ (i.e., the TPC error is small) is smaller than SRS transmission power $P_{SRS}(i)$ in the case of greater power difference $\Delta P$ (i.e., the TPC error is large). That is, terminal 300 sets smaller SRS transmission power for smaller power difference $\Delta P$.

As described above, the TPC error decreases as power difference $\Delta P$ decreases. For this reason, when terminal 300 sets smaller SRS transmission power for smaller power difference $\Delta P$, there is a low probability that the reception SINR decreases to a certain level (0 dB or less in FIG. 1) due to the influence of the TPC error. Thus, the SINR measurement accuracy at base station 200 is less likely to be deteriorated.

That is, terminal 300 can set the SRS transmission power down to a necessary minimum value with which a desired reception SINR can be acquired at base station 200 by correcting the offset value instructed from base station 200 according to power difference $\Delta P$. Here, the desired reception SINR refers to reception SINR with which the SINR measurement accuracy is not deteriorated. With this configuration, the SINR measurement accuracy of SRS (measurement accuracy of channel quality) at base station 200 can be ensured while power consumption at terminal 300 is reduced to a necessary minimum. In other words, determination of appropriate SRS transmission power according to the assumed TPC error at terminal 300 can reduce waste power consumption.

In this way, according to the present embodiment, the terminal determines the transmission power offset value according to the transmission condition (in the present embodiment, difference of transmission power) about the relationship between the uplink channel (uplink signal) transmitted and the succeeding SRS to be transmitted. With this configuration, the terminal can reduce SRS transmission power as the above difference of transmission power is smaller, i.e., as the influence of the TPC error is smaller. This can prevent deterioration of the SINR measurement accuracy caused by the TPC error at the base station while suppressing an increase in power consumption of the terminal. Furthermore, according to the present embodiment, the terminal can reduce the inter-cell interference by reducing the SRS transmission power to a necessary minimum.

Furthermore, in the present embodiment, in the case where, for example, the system defines in advance the correspondence between power difference $\Delta P$ and correction value $\Delta_{offset}$ shown in FIG. 7, signaling does not need to be performed for every SRS transmission for SRS transmission power control. Alternatively, in the case where the correspondence between power difference ΔP and correction value $\Delta_{offset}$ shown in FIG. 7 is reported in advance from the base station to the terminal as a parameter, the parameter needs to be reported in a relatively long period or just once to the terminal and signaling does not need to be performed for every SRS transmission for SRS transmission power control. Thus, in such cases, an increase in signaling overhead for the SRS transmission power control can be suppressed as with Embodiment 1.

Furthermore, according to the present embodiment, because the base station can know the difference between the SRS transmission power and the PUSCH transmission power (i.e., transmission power offset value for SRS), the base station can derive the SINR measurement value for PUSCH (SINR measurement value for data) from the SINR measurement value of SRS (SINR measurement value for SRS). Thus, prevention of deterioration of the SINR measurement accuracy of SRS at the base station as described above leads to prevention of deterioration of the SINR measurement accuracy of PUSCH. This enables the base station to perform precise scheduling of PUSCH (frequency resource assignment and MCS selection) as with Embodiment 1.

Embodiment 3

In Embodiment 1, a case has been described in which a terminal determines a correction value for an offset value instructed from a base station according to the SRS transmission period. In the present embodiment, a case will be described in which the terminal sets the offset value instructed from the base station to an SRS to which no transmission period is set.

Figure 8:
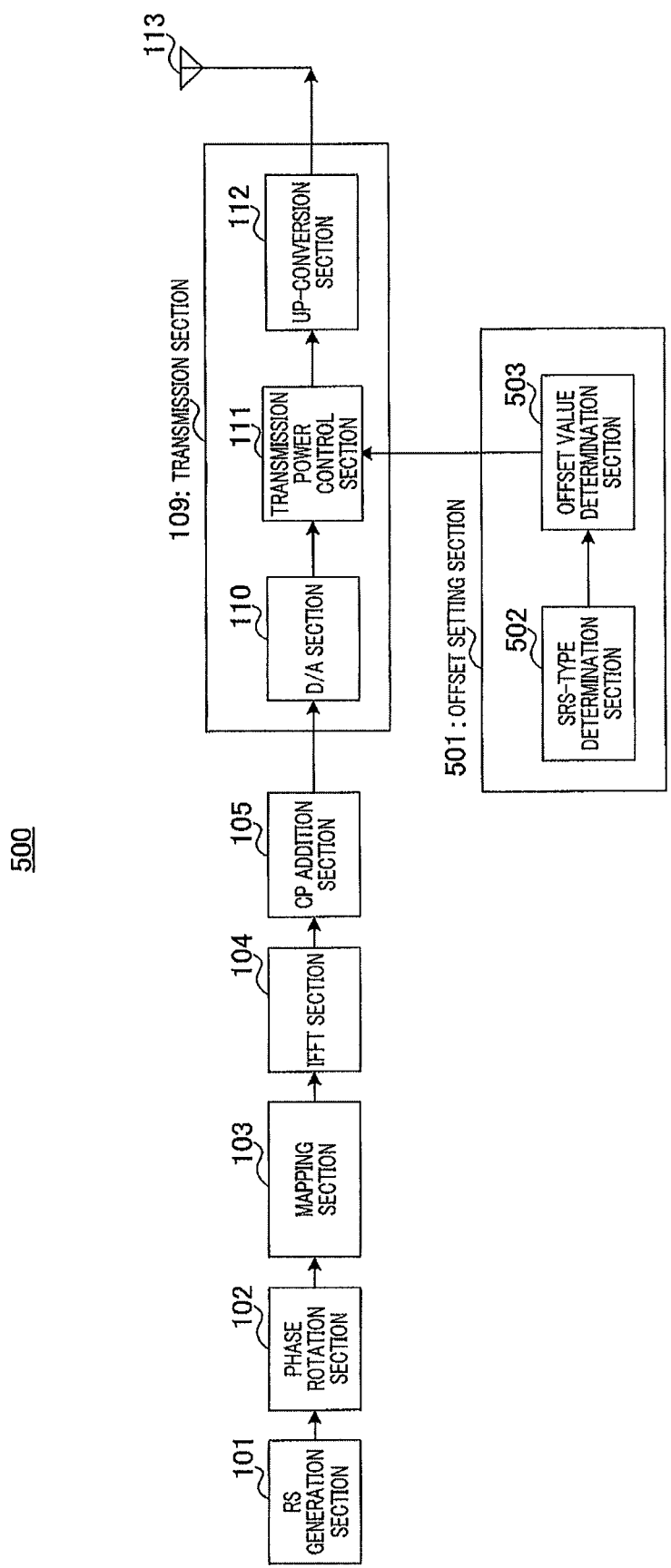
FIG. 8 is a block diagram of a configuration of a terminal according to Embodiment 3 of the present invention.

The present embodiment will now be described in detail. FIG. 8 shows a configuration of terminal 500 according to the present embodiment. Components in FIG. 8 that are the same as components in Embodiment 1 (FIG. 2) will be assigned the same reference numerals as in FIG. 2 and overlapping explanations will be omitted.

In terminal 500 in FIG. 8, offset setting section 501 includes SRS-type determination section 502 and offset value determination section 503. Offset setting section 501 determines an offset value for PUSCH transmission power (transmission power offset value. $P_{SRS\_OFFSET}$ shown in Equation 1) which is used to determine transmission power of an RS sequence (SRS).

Specifically, SRS-type determination section 502 determines the type of the succeeding SRS to be transmitted in an uplink from terminal 500. The types of SRS include an SRS to which a transmission period is set (hereinafter referred to as "periodic-SRS") and an SRS to which no transmission period is set (hereinafter referred to as "aperiodic-SRS"). The aperiodic-SRS refers to an SRS transmitted from a terminal once or predetermined times after the terminal receives a trigger signal from base station 200. SRS-type determination section 502 outputs information indicating which type the succeeding SRS to be transmitted belongs to (type of the succeeding SRS to be transmitted) to offset value determination section 503.

Offset value determination section 503 selects offset value $P_{SRS\_OFFSET}$ ($P_{SRS\_OFFSET}$ shown in Equation 1), which is associated with the type of SRS, according to the type of SRS received from SRS-type determination section 502, the offset value $P_{SRS\_OFFSET}$ being instructed in advance from base station 200. Then, offset value determination section 503 outputs the selected offset value ($P_{SRS\_OFFSET}$) for PUSCH transmission power to transmission power control section 111.

Furthermore, offset setting section 208 (FIG. 3) of base station 200 according to the present embodiment performs the same process as offset setting section 501 of terminal 500. That is, offset setting section 208 determines the offset value for the PUSCH transmission power (transmission power offset value, i.e., $P_{SRS\_OFFSET}$ shown in Equation 1), which is used to determine the transmission power of an SRS to be transmitted from terminal 500 (desired terminal). That is, offset setting section 208 selects offset value $P_{SRS\_OFFSET}$ associated with the type of SRS according to the type of the succeeding SRS to be transmitted from the desired terminal.

Next, the process of setting the transmission power offset value in offset setting section 501 of terminal 500 (FIG. 8) will now be explained in detail.

The aperiodic-SRS and periodic-SRS need different transmission power. Specifically, the aperiodic-SRS tends to need greater transmission power than the periodic-SRS for the following three reasons:

First, with the aperiodic-SRS, an elapsed time between transmissions is likely to be longer than that for the periodic-SRS to be transmitted periodically, and thus the TPC error is likely to increase. Setting a shorter transmission period (e.g., 20 ms or less) to the periodic-SRS reduces the TPC error. On the other hand, in the case where the terminal does not transmit an uplink channel (e.g., PUSCH) for some time before transmission of the aperiodic-SRS, the elapsed time of the transmissions is long, increasing the TPC error. In order to prevent deterioration of the measurement accuracy of channel quality caused by the TPC error, greater transmission power must be assigned to the aperiodic-SRS.

Second, because the number of aperiodic-SRSs to be transmitted is limited compared to that of periodic-SRSs, the measurement accuracy cannot be improved by averaging a plurality of aperiodic-SRSs unlike the case with the periodic-SRS. Hence, greater transmission power must be assigned to the aperiodic-SRS to acquire the measurement accuracy equivalent to that of the periodic-SRS.

Lastly, the aperiodic-SRS may be used to instantaneously measure the uplink quality to precisely select MCS for the PUSCH. That is, the precise measurement accuracy is required for the aperiodic-SRS, and thus greater transmission power must be assigned to the aperiodic-SRS than the periodic-SRS.

For these reasons, necessary transmission power may vary depending on the type of SRS (aperiodic-SRS or periodic-SRS). If offset value $P_{SRS\_OFFSET}$ used to determine the SRS transmission power is constant regardless of the type of SRS, the terminal must set the transmission power (offset value) of the type of SRS requiring greater transmission power (here, mainly, aperiodic-SRS) to the transmission power of all types of SRS including other types of SRS (here, mainly, periodic-SRS). In this case, greater transmission power than necessary is assigned to the periodic-SRS, increasing power consumption of the terminal. Furthermore, if offset value $P_{SRS\_OFFSET}$ is updated at every transmission of the aperiodic-SRS, the frequency of reporting of control information increases, increasing the system overhead.

In the present embodiment, to overcome the above problem, offset setting section 501 of terminal 500 determines offset value $P_{SRS\_OFFSET}$ ($P_{SRS\_OFFSET}$ shown in Equation 1), which is used to determine the SRS transmission power, according to the type of succeeding SRS to be transmitted (specifically, aperiodic-SRS and periodic-SRS).

In the following explanation, terminal 500 uses the equation of transmission power shown in Equation 1 to calculate SRS transmission power $P_{SRS}(i)$. Furthermore, $P_{SRS\_OFFSET}$ shown in Equation 1 is determined with reference to, for example, a maximum TPC error of each type of SRS. That is, offset value $P_{SRS\_OFFSET}$ is set to a necessary value for meeting the requirements for measurement quality. Offset value $P_{SRS\_OFFSET}$ is reported in advance from base station 200 to terminal 400 (the method of reporting $P_{SRS\_OFFSET}$ of each type of SRS will be explained in detail later).

SRS-type determination section 502 outputs the determined type of succeeding SRS to be transmitted (aperiodic-SRS or periodic-SRS) to offset value determination section 503.

Then, offset value determination section 503 selects offset value $P_{SRS\_OFFSET}$ associated with the type of SRS determined in SRS-type determination section 502.

For example, as shown in FIG. 9, offset value determination section 503 sets offset value $P_{SRS\_OFFSET}$ to 3 dB when the terminal transmits the aperiodic-SRS, and sets offset value $P_{SRS\_OFFSET}$ to 0 dB when the terminal transmits the periodic-SRS. That is, offset value determination section 503 sets a greater offset value for the transmission power of the aperiodic-SRS, which requires greater transmission power, than the offset value for the transmission power of the periodic-SRS, as described above.

That is, offset value determination section 503 determines the offset value according to whether the transmission period is set to the SRS. Specifically, offset value determination section 503 sets the offset value such that the transmission power of the periodic-SRS is lower than the transmission power of the aperiodic-SRS.

Here, the correspondence between the type of SRS and offset value $P_{SRS\_OFFSET}$ shown in FIG. 9 is reported in advance from base station 200 to terminal 500. An optimum offset value $P_{SRS\_OFFSET}$ of each type of SRS is determined according to the condition for determining an SRS at base station 200 (e.g., the transmission period of periodic-SRS or the transmission timing of aperiodic-SRS). Hence, the above correspondence does not need to be reported frequently (in a short period).

Here, the specific methods of reporting the correspondence between the type of SRS and the offset value shown in FIG. 9 from base station 200 to terminal 500 will now be explained. In LTE, offset value $P_{SRS\_OFFSET}$ of the periodic-SRS is reported as information about power control (e.g., "UplinkPowerControl" prescribed in [3GPP TS36.331 V8.9.0(2010-03), "3GPP TSGRAN E-UTRA RRC Protocol specification (Release 8)"]. Information containing $P_{O\_PUSCH}$ or a, which are parameters in Equation 1).

On the other hand, for reporting offset value $P_{SRS\_OFFSET}$ of the aperiodic-SRS in addition to offset value $P_{SRS\_OFFSET}$ of the periodic-SRS, as performed in the present embodiment, the following four methods may be employed. As explained below, some reporting methods can reduce signaling for reporting offset value $P_{SRS\_OFFSET}$ of the aperiodic-SRS.

The first reporting method is a method of reporting offset value $P_{SRS\_OFFSET}$ of the aperiodic-SRS by containing the offset value in information about power control, as with the method of reporting offset value $P_{SRS\_OFFSET}$ of the periodic-SRS. In this reporting method, in order to allow terminal 500 to transmit an aperiodic-SRS, base station 200 must also report SRS resource information for aperiodic-SRS in addition to the information about power control. Examples of the SRS resource information includes information indicating SRS transmission resource, such as "SoundingRS-UL-Config" prescribed in [3GPP TS36.331 V8.9.0(2010-03), "3GPP TSGRAN E-UTRA RRC Protocol specification (Release 8)"] (information containing, for example, the bandwidth or frequency hopping pattern for SRS transmission). Thus, in this reporting method, the base station must report two kinds of parameters to allow the terminal to transmit the aperiodic-SRS, increasing the signaling load.

The second reporting method is a method of reporting offset value $P_{SRS\_OFFSET}$ of the aperiodic-SRS separately by containing the offset value in the SRS resource information for the aperiodic-SRS. In this reporting method, in order to allow terminal 500 to transmit the aperiodic-SRS, base station 200 needs to report only the SRS resource information for the aperiodic-SRS. Thus, this reporting method requires less signaling load for reporting offset value $P_{SRS\_OFFSET}$ of the aperiodic-SRS than the first reporting method.

The third reporting method is a method of reporting correction value ($\Delta_{offset}$) for offset value $P_{SRS\_OFFSET}$ of the periodic-SRS as with Embodiments 1 and 2. The transmission powers of the periodic-SRS and aperiodic-SRS are calculated using Equations 1 and 2, respectively. Here, because the range of $\Delta_{offset}$ to be reported does not need to be set greater than the range of $P_{SRS\_OFFSET}$ to be reported, the smaller number of reporting bits can be used for $\Delta_{offset}$ than $P_{SRS\_OFFSET}$, which requires four bits in LTE. Hence, this reporting method requires less signaling load for reporting offset value $P_{SRS\_OFFSET}$ of the aperiodic-SRS (i.e., "$P_{SRS\_OFFSET}+\Delta_{offset}$" shown in Equation 2). Correction value $\Delta_{offset}$ may be defined as a fixed value for the whole system. In this case, signaling from base station 200 to terminal 500 does not need to be performed.

The fourth reporting method is a method of reporting offset value $P_{SRS\_OFFSET}$ in a different range for the aperiodic-SRS from that for the periodic-SRS. For example, base station 200 uses a different range of offset value $P_{SRS\_OFFSET}$ for the aperiodic-SRS from that for the periodic-SRS, even when the same number of reporting bits is used for the both two types of SRS:

Range of offset value $P_{SRS\_OFFSET}$ of aperiodic-SRS to be reported: −7.5 to 15 dB Range of offset value $P_{SRS\_OFFSET}$ of periodic-SRS to be reported: −10.5 to 12 dB That is, the range of offset value $P_{SRS\_OFFSET}$ of the periodic-SRS to be reported is shifted to the positive direction by a certain amount (by 3 dB in the above example) to determine the range of offset value $P_{SRS\_OFFSET}$ of the aperiodic-SRS to be reported. Thus, in this reporting method, necessary transmission power can be determined according to the type of SRS without increasing the number of signaling bits.

In this way, in the present embodiment, terminal 500 determines the transmission power offset value for SRS according to the type of succeeding SRS to be transmitted from terminal 500. This enables terminal 500 to assign individual necessary transmission power to the aperiodic-SRS and the periodic-SRS. Furthermore, according to the present embodiment, at terminal 500, the transmission power identical to that of the aperiodic-SRS does not need to be assigned to the periodic-SRS, and thus the transmission power of the periodic-SRS does not increase. For this reason, the periodic-SRS can be transmitted with a necessary minimum power. Thus, it is possible to prevent the greater transmission power than necessary from being assigned to the periodic-SRS, reducing the power consumption of the terminal. Thus, according to the present embodiment, deterioration of the SINR measurement accuracy caused by the TPC error can be prevented at base station 200 while an increase in power consumption of terminal 500 is reduced. Furthermore, according to the present embodiment, offset value P$_{SRS\_OFFSET}$ does not need to be updated at every transmission of the aperiodic-SRS, preventing an increase in the system overhead.

Furthermore, in the present embodiment, a case has been described where the two types of SRS, the aperiodic-SRS and periodic-SRS, are used. SRSs, however, may be categorized into a greater number of types. For example, in LTE-Advanced, the use of "one-shot SRS" and "multi-shot SRS" as the aperiodic-SRS is being studied. The one-shot SRS is transmitted only once after reception of a trigger signal from a base station and the multi-shot SRS is transmitted predetermined multiple times only after reception of the trigger signal from the base station. Examples of the trigger signal from the base station include a signal containing information constituting at least one bit, which is transmitted through a downlink control channel called a physical downlink control channel (PDCCH). The base station uses this information to instruct a terminal to transmit the aperiodic-SRS. In response to the trigger signal from the base station, the terminal transmits an SRS once or predetermined multiple times during a predetermined SRS transmission time. Furthermore, the multi-shot SRSs can be categorized into an SRS transmitted in a single frequency band for the purpose of improving the measurement accuracy of the channel quality and an SRS transmitted in different frequency bands for the purpose of measuring the channel quality in a wide band. The terminal may define these aperiodic-SRSs as different types of SRS to determine offset value P$_{SRS\_OFFSET}$ according to the type of SRS.

For example, as shown in FIG. 10, a terminal (offset value determination section 503) sets offset value P$_{SRS\_OFFSET}$ of 3 dB to an one-shot SRS, sets offset value P$_{SRS\_OFFSET}$ of 1.5 dB to a multi-shot SRS transmitted in a single frequency band, and sets offset value P$_{SRS\_OFFSET}$ of 3 dB to the multi-shot SRS transmitted in different frequency bands. That is, as shown in FIG. 10, the terminal associates greater offset value P$_{SRS\_OFFSET}$ with the one-shot SRS than with the multi-shot SRS transmitted in a single frequency band for the following reason: in the case of the multi-shot SRS transmitted in a single band, averaging a plurality of SRSs at the base station can improve the measurement quality of the channel. On the other hand, in the case of the one-shot SRS, the improvement of the measurement quality by virtue of averaging of SRSs cannot be expected at the base station, and thus the one-shot SRS requires greater transmission power. Furthermore, the terminal sets the same offset value P$_{SRS\_OFFSET}$ to the multi-shot SRS transmitted in different frequency bands and the one-shot SRS for the following reason: in the case of the multi-shot SRS transmitted in different frequency bands, the improvement of the measurement quality by virtue of averaging of SRSs cannot be expected at the base station, as with the case of the one-shot SRS. Thus, the multi-shot SRS requires the same necessary transmission power as the one-shot SRS.

Alternatively, the terminal may categorize the aperiodic-SRSs into different types of SRS depending on the interval of subcarriers in which the aperiodic-SRS is arranged, and may determine offset value P$_{SRS\_OFFSET}$ according to the type of SRS.

For example, as shown in FIG. 11, the terminal (offset value determination section 503) sets offset value P$_{SRS\_OFFSET}$ of 1.5 dB to an aperiodic-SRS arranged at a subcarrier interval of 15 kHz, and sets offset value P$_{SRS\_OFFSET}$ of 3.0 dB to an aperiodic-SRS arranged at a subcarrier interval of 30 kHz. That is, the terminal associates greater offset value P$_{SRS\_OFFSET}$ with an aperiodic-SRS arranged at a longer subcarrier interval. This is because extension of the subcarrier interval leads to a decrease in the average number of subcarriers used for the measurement of channel quality per unit frequency band, thus impairing the measurement accuracy of the channel quality (making variation greater) at the base station. Thus, the aperiodic-SRS arranged at a longer subcarrier interval requires greater transmission power.

Embodiments of the present invention have been described.

Figure 12:
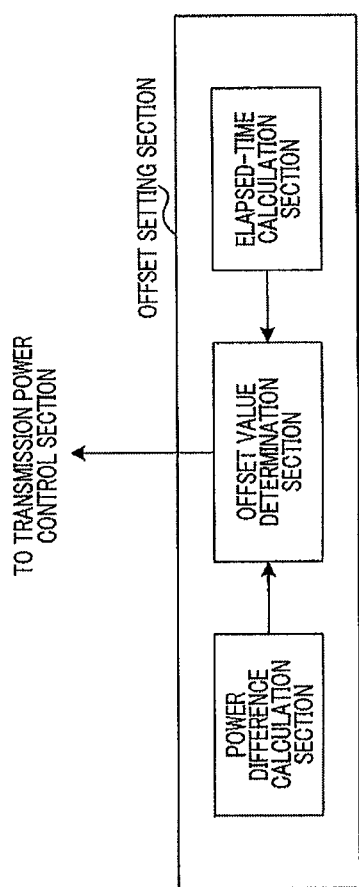
FIG. 12 is a block diagram of another internal configuration of an offset setting section according to the present invention.

In the present invention, configurations of Embodiments 1 and 2 may be combined. Specifically, the offset setting section of the terminal includes the elapsed-time calculation section, the power difference calculation section, and the offset value determination section, as shown in FIG. 12. That is, the offset value determination section shown in FIG. 12 determines correction value Δ$_{offset}$ for offset value P$_{SRS\_OFFSET}$ shown in Equation 2 according to both of elapsed time T explained in Embodiment 1 and power difference ΔP explained in Embodiment 2. Specifically, as shown in FIG. 13, correction value Δ$_{offset}$ is associated with elapsed time T and power difference ΔP. Correction value Δ$_{offset}$ in FIG. 13 is associated with elapsed time T and power difference ΔP according to the allowable ranges of the TPC error prescribed in LTE (for example, see 3GPP TS36.101 v8.9.0 (Table 6.3.5.2.1-1)), which are shown in FIGS. 14A and 14B. Here, FIG. 14A shows the provision of the allowable range of the TPC error (±9.0 dB) in the case of elapsed time T longer than 20 ms (T>20 ms). FIG. 14B shows the provision of the allowable range of the TPC error in the case of elapsed time T of 20 ms or less (T≤20 ms). In FIG. 14B, grater power difference ΔP is associated with the greater allowable range of the TPC error.

In FIG. 13, constant correction value Δ$_{offset}$ (0 dB) is associated both with the case of elapsed time of T>20 ms and with the case of elapsed time of T≥20 ms and ΔP of 15 dB or greater, based on FIGS. 14A and 14B. That is, constant correction value Δ$_{offset}$ is associated with different elapsed times T. Alternatively, according to the present invention, greater correction value Δ$_{offset}$ may be associated with longer elapsed time T as shown in FIG. 15 instead of FIG. 13. That is, in FIG. 15, different correction value Δ$_{offset}$ is associated with different elapsed times T and with different power differences ΔP. Furthermore, in FIG. 13, constant correction value Δ$_{offset}$ is associated with longer elapsed time T (T>20 ms) regardless of the value of power difference ΔP. Alternatively, as shown in FIG. 15, different correction value Δ$_{offset}$ may be associated with longer elapsed time T (T>20 ms) according to power difference ΔP.

By using the correspondences in FIGS. 13 and 15, the terminal can control the SRS transmission power by taking into consideration both elapsed time T and power difference ΔP. That is, the terminal can control SRS transmission power more precisely and can further reduce the waste power consumption compared to the above embodiments while preventing deterioration of the SINR measurement accuracy caused by the TPC error at the base station.

Figure 16:
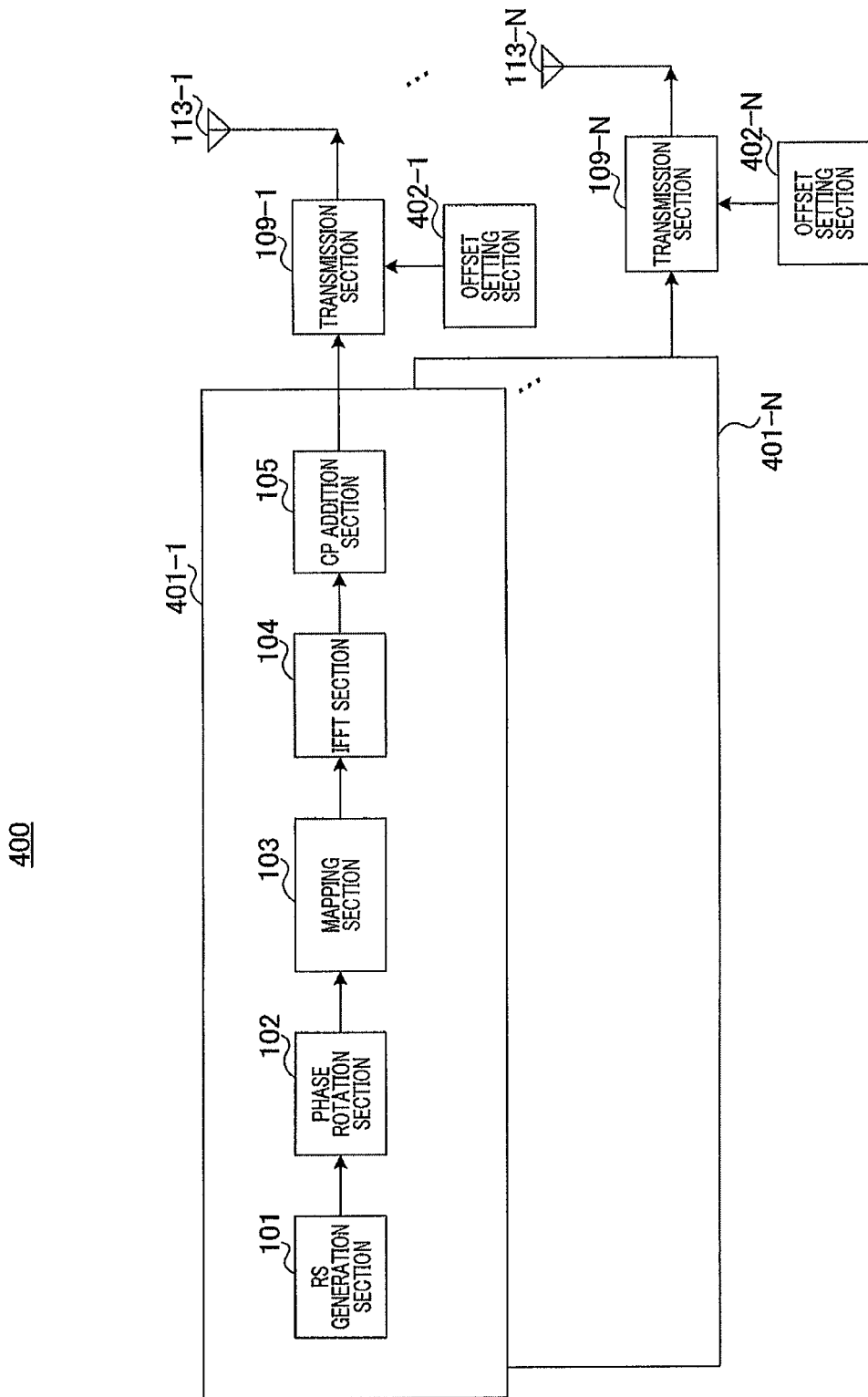
FIG. 16 is a block diagram of another configuration of a terminal according to the present invention (in the case where the terminal has a plurality of antennas)

Although a case has been described where a terminal has a single antenna in the above embodiments, the present invention can be applied to a case where a terminal has a plurality of antennas. For example, as shown in FIG. 16, terminal 400 having N antennas 113-1 to 113-N includes transmission processing sections 401-1 to 401-N corresponding to the respective antennas. Here, each transmission processing section 401 includes, for example, components from RS generation section 101 to CP addition section 105 shown in FIG. 2. Furthermore, offset setting sections 402-1 to 402-N shown in FIG. 16 may employ the same configuration as offset setting section 106 (FIG. 2), offset setting section 301 (FIG. 6), offset setting section 501 (FIG. 8), or offset setting section (FIG. 12). Offset setting sections 402 of respective transmission processing sections 401 of terminal 400 shown in FIG. 16 determine correction values $\Delta_{offset}$ for offset values $P_{SRS\_OFFSET}$ (or offset values $P_{SRS\_OFFSET}$) of respective SRSs transmitted from the respective antennas according to the respective transmission time intervals (above-described elapsed times T or SRS transmission periods $T_{SRS}$) or respective differences of transmission power (above-described power differences $\Delta P$) in the antennas. Then, transmission power control sections 111 in transmission sections 109 of terminal 400 control respective transmission power of the SRSs transmitted from the antennas by adding respective correction values $\Delta_{offset}$ assigned to SRSs transmitted from antennas to respective offset values $P_{SRS\_OFFSET}$ (or by using determined offset values $P_{SRS\_OFFSET}$). In this way, terminal 400 separately determines correction values $\Delta_{offset}$ (or offset values $P_{SRS\_OFFSET}$, for example) which are used to control transmission power of the SRSs transmitted from antennas. That is, terminal 400 determines offset values for the respective SRSs transmitted from the respective antennas according to the respective transmission time intervals between SRSs (e.g., SRS transmission periods) in the antennas, and uses the offset values assigned to respective SRSs to control transmission power of SRSs transmitted from the antennas. This enables terminal 400 to set different transmission power to each antenna using, for example, a common parameter (e.g., offset value $P_{SRS\_OFFSET}$) reported from the base station to the antennas. With this configuration, terminal 400 can appropriately control the SRS transmission power for each antenna, and thus can further reduce the SRS transmission power compared to a conventional technique in which the SRS transmission power is controlled uniformly for all antennas.

Furthermore, in the present invention, when a terminal has a plurality of antennas as explained in FIG. 16, the terminal may control transmission power of the SRSs by using the ratio of each correction value $\Delta_{offset}$ for offset value $P_{SRS\_OFFSET}$ (or ratio of each offset value $P_{SRS\_OFFSET}$) assigned to each SRS, as the ratio of the transmission power assigned to each SRS to the total transmission power assigned to all SRSs transmitted from the antennas. Specifically, although the above embodiments describes a case in which transmission power of an SRS transmitted from each antenna is defined as $P_{SRS}(i)$ shown in Equation 1 or 2, this embodiment describes a case in which the terminal defines the total transmission power of a plurality of SRSs transmitted simultaneously from the plurality of antennas as $P_{SRS}(i)$ shown in Equation 1 or 2. That is, total transmission power $P_{SRS}(i)$ of the plurality of SRSs is calculated by adding offset value $P_{SRS\_OFFSET}$ to the PUSCH transmission power. Then, as with the above embodiments, the terminal determines correction values $\Delta_{offset}$ for respective offset values $P_{SRS\_OFFSET}$ according to the respective transmission time intervals (elapsed times T (e.g., FIG. 4)) or power differences $\Delta P$ (e.g., FIG. 7)), or differences of transmission power (power differences $\Delta P$ (e.g., FIG. 7)) in the respective antennas (or offset values $P_{SRS\_OFFSET}$ is determined according to the respective SRS transmission periods (types of SRS (e.g., FIGS. 9-11) in the antennas). Then, the terminal controls transmission power of the SRSs by using the ratio of correction value $\Delta_{offset}$ (or the ratio of offset value $P_{SRS\_OFFSET}$) assigned to each of the SRSs transmitted from the respective antennas as the ratio of transmission power assigned to each of the SRS transmitted from the respective antennas to the total transmission power $P_{SRS}(i)$. That is, in an antenna from which an SRS having smaller correction value $\Delta_{offset}$ (or offset value $P_{SRS\_OFFSET}$) is transmitted, the ratio of transmission power of the SRS to total transmission power $P_{SRS}(i)$ is smaller and smaller transmission power is assigned to the antenna. In other word, in the antenna from which an SRS having smaller correction value $\Delta_{offset}$ is transmitted (the TPC error is smaller), deterioration of the SINR measurement accuracy at the base station can be further prevented and the SRS transmission power at the terminal can be further reduced. In this way, similar effects to the above embodiments can be obtained even in the case where the terminal uses correction value $\Delta_{offset}$ determined according to elapsed time T or power difference $\Delta P$ (or the SRS transmission period (offset value $P_{SRS\_OFFSET}$ determined according to the type of SRS)), as the ratio of transmission power of each SRS transmitted from each antenna.

Furthermore, in the above embodiments, a case has been described where $P_{SRS\_OFFSET}$ shown in Equation 2 is determined with reference to an assumed maximum TPC error (e.g., FIGS. 4 and 7). Alternatively, according to the present invention, $P_{SRS\_OFFSET}$ shown in Equation 2 may be determined with reference to an assumed minimum TPC error. In this case, correction value $\Delta_{offset}$ may be determined such that greater correction value $\Delta_{offset}$ is associated with longer elapsed time T (T>20 ms) as shown in FIG. 17, and such that greater correction value $\Delta_{offset}$ is associated with greater power difference $\Delta P$ as shown in FIG. 18.

Although a case has been described with the above embodiment where the present invention is configured as an antenna, the present invention is also applicable to an antenna port.

The term, antenna port, refers to a logical antenna configured with one or a plurality of physical antennas. That is, an antenna port does not always refer to one physical antenna, and can also refer to, for example, an array antenna configured with a plurality of antennas.

For example, in LTE, how many physical antennas constitute the antenna port is not prescribed, and an antenna port is prescribed as a minimum unit by which a base station can transmit a different reference signal.

Further, an antenna port is also prescribed as a minimum unit with which the weight of precoding vector is multiplied.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2010-105323, filed on Apr. 30, 2010 and Japanese Patent Application No. 2010-249128, filed on Nov. 5, 2010, including the specifications, drawings and abstracts, are incorporated herein by reference in their entirety.

INDUSTRIAL APPLICABILITY

The present invention is applicable to a mobile communication system, for example.

REFERENCE SIGNS LIST 100, 300, 400, 500 terminal
200 base station
101 RS generation section
102 phase rotation section
103 mapping section
104 IFFT section
105 CP addition section
106, 208, 301, 402, 501 offset setting section
107 elapsed-time calculation section
108, 303, 503 offset value determination section
109 transmission section
110 D/A section
111 transmission power control section
112 up-conversion section
113, 201 antenna
202 reception section
203 CP removal section
204 FFT section
205 demapping section
206 cyclic shift amount setting section
207 SRS SINK measurement section
209 data SINR deriving section
210 channel quality deriving section
302 power difference calculation section
401 transmission processing section
502 SRS-type determination section

The invention claimed is:

1. An integrated circuit comprising:
circuitry, which, in operation, controls
generating a first Sounding Reference Signal (SRS) which is to be transmitted periodically and a second SRS which is to be transmitted with a time interval between triggering and transmission that is different from a transmission time interval of the first SRS, both of the first SRS and the second SRS being reference signals for channel-quality estimation; and
transmitting the first SRS with a transmission power controlled based on a first power parameter indicated by a base station and transmitting the second SRS with a transmission power controlled based on a second power parameter indicated by the base station, the second power parameter being different from the first power parameter.

2. The integrated circuit according to claim 1, wherein a greater power is set for a longer transmission time interval.

3. The integrated circuit according to claim 1, wherein the first SRS is a periodic SRS, and the second SRS is an aperiodic SRS which is transmitted aperiodically.

4. The integrated circuit according to claim 3, wherein the second power parameter is set to be greater than the first power parameter.

* * * * *